(12) United States Patent
Aoshima (10) Patent No.: US 7,862,676 B2
(45) Date of Patent: Jan. 4, 2011

(54) METHOD FOR STRETCHING POLYMER FILM AND DEVICE FOR RECOVERING SLIT FILM EDGE

(75) Inventor: Shinsuke Aoshima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 286 days.

(21) Appl. No.: 12/058,598

(22) Filed: Mar. 28, 2008

(65) Prior Publication Data

US 2008/0236721 A1   Oct. 2, 2008

(30) Foreign Application Priority Data

Mar. 28, 2007 (JP) .............................. 2007-084427

(51) Int. Cl.
| | |
|---|---|
| B29C 65/00 | (2006.01) |
| B29C 51/16 | (2006.01) |
| B29C 71/00 | (2006.01) |
| B29C 49/08 | (2006.01) |
| B29C 55/00 | (2006.01) |
| B32B 37/00 | (2006.01) |
| A61F 13/15 | (2006.01) |
| D06M 11/26 | (2006.01) |
| D01F 11/02 | (2006.01) |
| D01D 5/12 | (2006.01) |
| D02J 1/20 | (2006.01) |
| B28B 11/08 | (2006.01) |
| B05D 3/12 | (2006.01) |
| B21F 9/00 | (2006.01) |
| C09J 7/02 | (2006.01) |
| D06C 3/00 | (2006.01) |
| D06C 5/00 | (2006.01) |

(52) U.S. Cl. .................. 156/229; 156/160; 156/212; 8/132; 264/197; 264/198; 264/210.1; 264/235.6; 264/291; 264/290.2; 427/171

(58) Field of Classification Search ................ 156/160, 156/212, 229; 8/132; 264/197–198, 210.1, 264/235.6, 291, 290.2; 288/4; 427/171
See application file for complete search history.

(56) References Cited

U.S. PATENT DOCUMENTS

| | | | | | |
|---|---|---|---|---|---|
| 3,087,610 | A | * | 4/1963 | Kirkpatrick | ................. 206/432 |
| 4,560,445 | A | * | 12/1985 | Hoover et al. | ............... 205/126 |
| 4,670,072 | A | * | 6/1987 | Pastor et al. | ............... 156/73.1 |
| 4,847,462 | A | * | 7/1989 | Soodak et al. | ......... 219/121.63 |
| 5,405,470 | A | * | 4/1995 | Held | .......................... 156/159 |
| 2007/0045896 | A1 | * | 3/2007 | Kato et al. | .................. 264/217 |

FOREIGN PATENT DOCUMENTS

JP   2002-311240 A   10/2002

* cited by examiner

*Primary Examiner*—Khanh Nguyen
*Assistant Examiner*—Matthew Hoover
(74) *Attorney, Agent, or Firm*—Sughrue Mion, PLLC (57) ABSTRACT

A rear end portion of a leading TAC film and a front end portion of a following TAC film are connected using a double-sided adhesive tape and a single-sided adhesive tape. A laser welding device emits a welding laser beam along a welding line onto the films. Owing to the welding laser beam, the leading and following TAC films are welded along the welding line. The laser welding device emits a cutout laser beam along a cutout line onto the films. Owing to the cutout laser beam, a part of the leading and following TAC films surrounded by the cutout line is cut out. The cut out part has the single-sided adhesive tape attached. Since the tape cannot be recycled, the cut out part is absorbed by an absorbing device and disposed.

10 Claims, 10 Drawing Sheets

METHOD FOR STRETCHING POLYMER FILM AND DEVICE FOR RECOVERING SLIT FILM EDGE

FIELD OF THE INVENTION

The present invention relates to a method for stretching polymer films and a device for recovering edges which have been slit from the films.

BACKGROUND OF THE INVENTION

In recent years, liquid crystal displays have been rapidly developed and spread. This trend caused an increase in demand for cellulose acylate films, especially triacetyl cellulose (TAC) films that are used as a protective film for the liquid crystal displays. Along with the increase in demand, the productivity of the TAC films is desired to be improved. The TAC films are often produced according to the following method. At first, a dope including TAC and a solvent is cast using a casting die onto a continuously running support to form a casting film. The casting film is dried or cooled to develop its self-supporting properties. After having possessed the self-supporting properties, the casting film is peeled from the support, and then dried and wound as a TAC film. According to such solution casting method, the produced film has few foreign substances mixed therein and has excellent optical properties, as compared to films produced according to a melt extrusion method.

In the solution casting method, the support for the dope may be a belt or a drum. To improve the casting speed, the drum is more preferred as compared to the belt. The casting film on the support is dried, or cooled and gelated in order to develop the self-supporting properties. Meanwhile, the film is stretched in order to control the optical properties, especially the retardation characteristics, of the produced TAC film.

Optimum speed of the film production and that of the film stretching vary from each other. The film production speed, that is, the casting speed is generally slower than the film stretching speed. Therefore, when the stretching speed is adjusted to the casting speed, the film may not be sufficiently stretched to improve the optical properties of the produced TAC film. In view of this, it is proposed that the film is stretched off-line, that is, outside a solution casting line (see, for example, Japanese Patent Laid-open Publication No. 2002-311240).

As disclosed in the Japanese Patent Laid-open Publication No. 2002-311240, when the film is stretched off-line, that is, independently from the solution casting line, it is preferable to stretch the film continuously so as to perform the film stretching effectively. In order to stretch the film continuously, a rear end of a leading film and a front end of a following film are connected using a connection tape.

During the stretching, both side edges of the film are held with holding members like clips. The film edges held with clips cannot be used as a product, and therefore they are slit to be separated from a main part of the film. The main part is going to be the end product. It is preferable to shred the slit edges into chips to be recycled for preparing the dope, in view of economic advantages.

However, the connection tape cannot be recycled for preparing the dope. Therefore, when the connection tape is used to connect the films, the connection tape needs to be removed from the films before or after the edges are slit. When the connection tape is removed, the slit edge of the leading film and the slit edge of the following film fall apart, which lowers the workability in recovering the slit edges. In addition, when the connection tape is not removed completely, the tape may be a foreign substance mixed into the recovered slit edges, which lowers the quality of the recycled TAC film. Such problems are not limited to the TAC film production, but may arise in any polymer film production where the slit film edges are recycled for preparing the dope.

SUMMARY OF THE INVENTION

It is an object of the present invention to provide a method for stretching polymer films and a device for recovering slit film edges which improve the workability in recovering slit film edges.

In order to achieve the above and other objects, a method according to the present invention for stretching polymer films in width directions thereof includes connecting step, supplying step, stretching step, welding step, cutting out step, slitting step, and recovering step. In the connecting step, a rear end of leading polymer film and a front end of following polymer film are connected using a connection tape. The connection tape is composed of a first tape and a second tape. The first tape connects side edges of the polymer films and the second tape connects main parts of the polymer films. The main part is a center part in the width direction of the polymer film between the side edges. This main part is going to be an end product. In the supplying step, the connected polymer films are continuously supplied. In the stretching step, the supplied polymer films are stretched by being held at both side edges thereof with clips. The polymer films are conveyed by the clips during the stretching step. In the welding step, the leading polymer film and the following polymer film are welded along a welding line after the stretching step. The welding line surrounds the first tape. In the cutting out step, a part with the first tape is cut out from the welded polymer films along a cutout line. The cutout line is inside the welding line and surrounds the first tape. In the slitting step, the side edges are slit from the main parts of the polymer films. In the recovering step, the slit side edges are recovered.

The welding step is preferably performed by a laser welding device, a heat sealer, or an ultrasonic joining device.

The cutting out step is preferably performed by a laser cutting device or a rotary die cutter.

The welding step and the cutting out step may also preferably be performed by a laser welding/cutting device.

A recovering device according to the present invention for recovering slit film edges is provided to a film stretching device for stretching polymer films in width directions thereof by holding both side edges of the polymer films with clips. During the stretching step, the polymer films are conveyed by the clips. The recovering device includes a connecting section, a supplying section, a welding section, a cutting out section, a slitting section, and a recovering section. The connecting section connects a rear end of leading polymer film and a front end of following polymer film using the connection tape composed of the first tape and the second tape. The supplying section supplies the connected polymer films continuously. The welding section welds the leading polymer film and the following polymer film along the welding line after the stretching step. The cutting out section cuts out a part with the first tape from the welded polymer films along the cutout line. The slitting section slits the side edges from the main parts of the polymer films. The recovering section recovers the slit side edges.

According to the present invention, the slit edge of the leading film and the slit edge of the following film are connected when they are recovered. Owing to this, the workability in recovering the slit edges can be improved. Moreover, the slit edges do not have the first tape attached, and therefore saving the trouble of removing the first tape. Owing to this, the workability in recovering the slit edges can be improved, and the recycling of the slit edges is facilitated.

According to the present invention, since the welding step is performed by the laser welding device, the leading polymer film and the following polymer film are welded easily and reliably.

BRIEF DESCRIPTION OF THE DRAWINGS

The above and other objects and advantages will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

Figure 1:
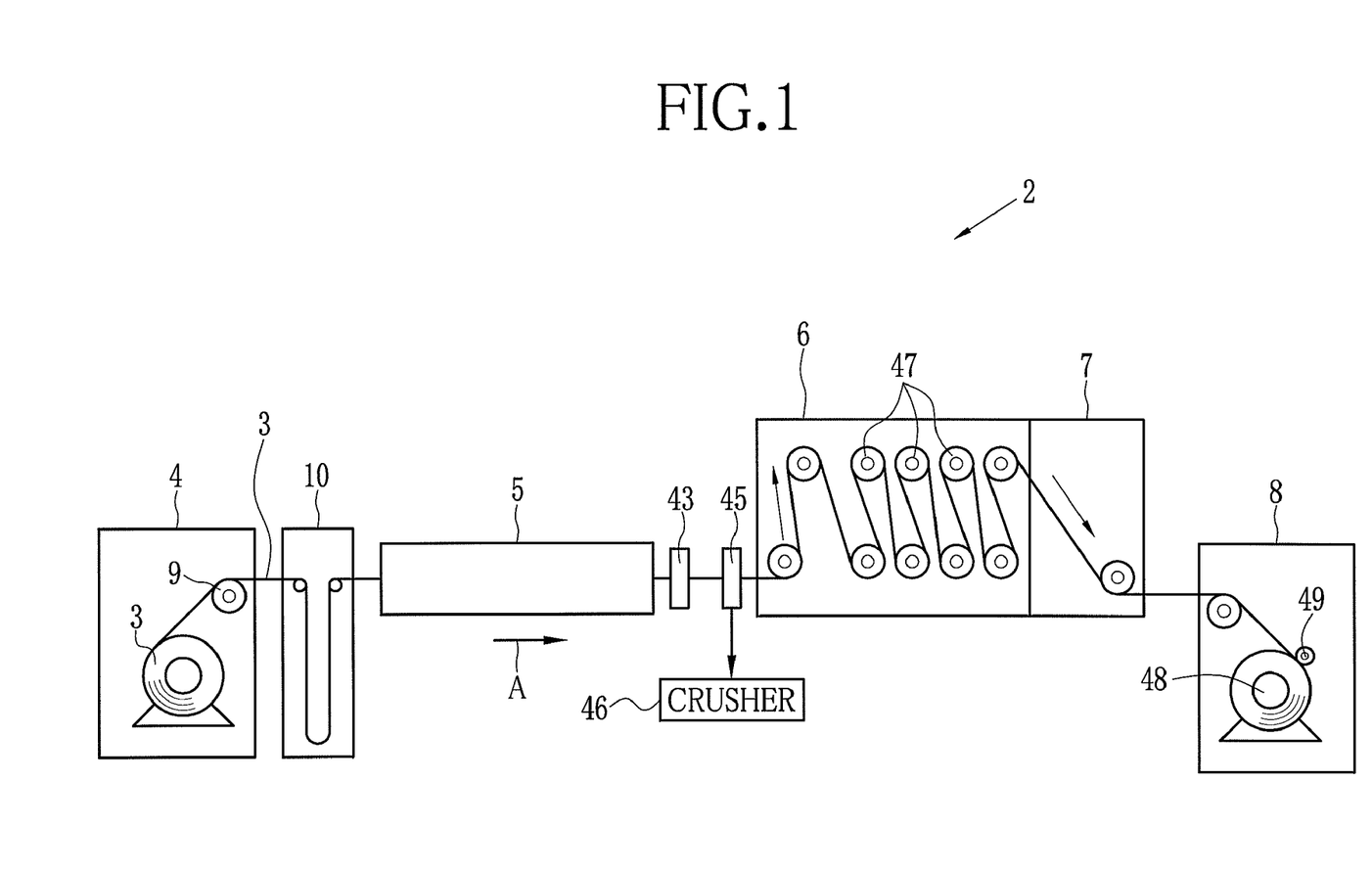
FIG. 1 is a schematic view illustrating an off-line stretching device.

As shown in FIG. 1, an off-line stretching device 2 is for stretching a TAC film 3, and provided with a supplying chamber 4, a tenter 5, a stress relaxation chamber 6 by heating, a cooling chamber 7, and a winding chamber 8. The supplying chamber 4 stores the TAC film 3 in a roll form. The TAC film 3 is supplied by a supply roller 9 to the tenter 5.

Figure 2:
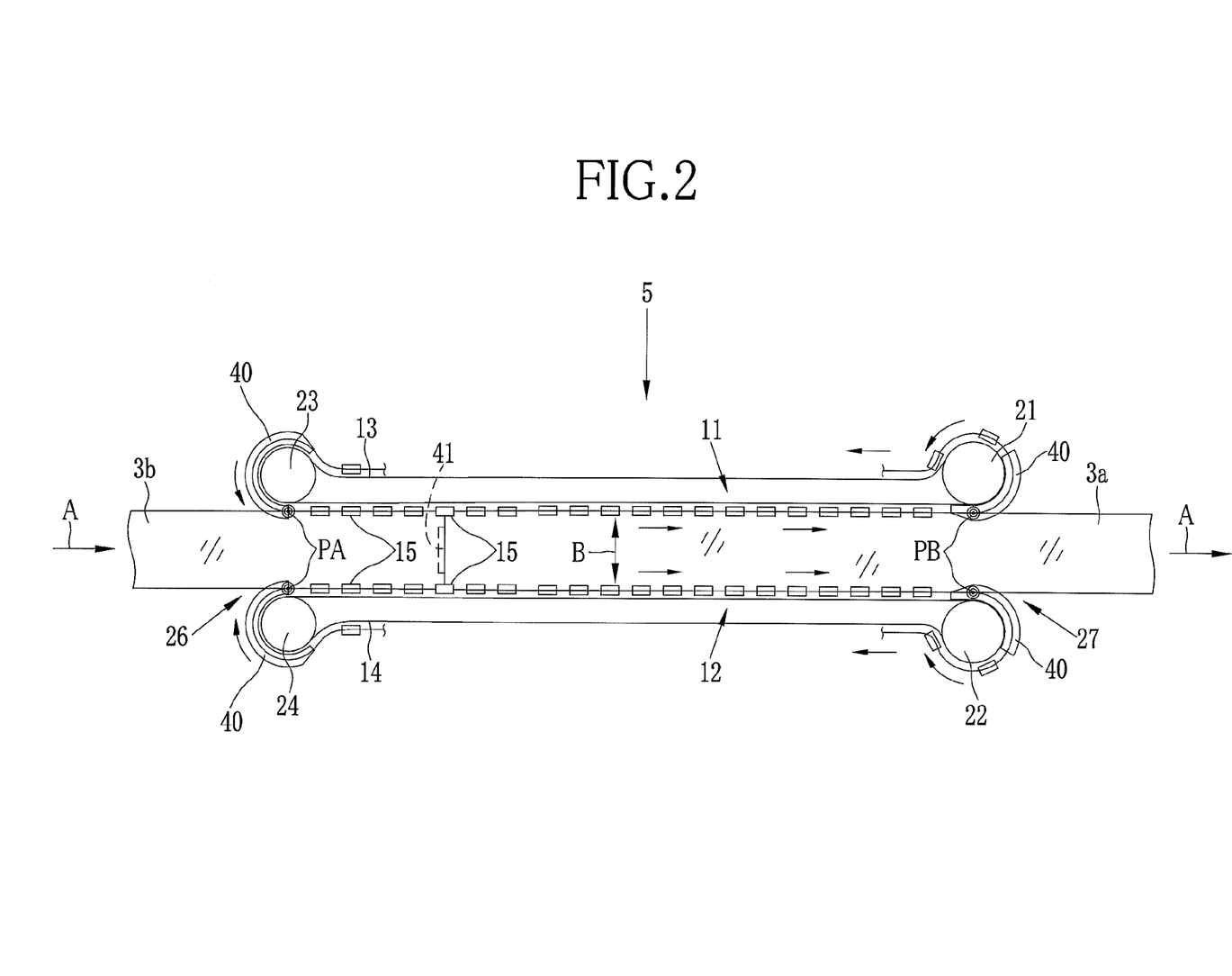
FIG. 2 is a schematic view illustrating a tenter.

In the tenter 5, both side edges of the TAC film 3 are held with clips 15 (see FIG. 2). While being conveyed at this state, the TAC film 3 is heated and stretched in film width directions B (see FIG. 2). The TAC film 3 is stretched by preferably 100.5% to 300% in the film width directions B with respect to the width of the TAC film 3 before the stretching.

A reservoir 10 is provided between the supplying chamber 4 and the tenter 5. In the reservoir 10, a certain length of TAC film 3 is reserved to form a loop. The certain length is a length enough for connecting the TAC films 3. The film connection is described later. After forming the loop, the TAC film 3 is sent to the tenter 5.

As shown in FIG. 2, the TAC film 3 is conveyed in a convey direction A and stretched in the film width directions B in the tenter 5. The tenter 5 is provided with a first rail 11, a second rail 12, a first chain 13 and a second chain 14 (both are endless chains). The first chain 13 is guided by the first rail 11, and the second chain 14 is guided by the second rail 12. Temperature inside the tenter 5 is kept high. The tenter 5 may be divided into plural zones in the convey direction A as necessary so as to change conditions for heating the TAC film 3 in each zone. For example, the tenter 5 may be divided, from upstream to downstream thereof, into pre-heating zone, heating zone, and stress relaxation zone by heating, in the convey direction A.

The clips 15 are attached to the first and second chains 13 and 14 at certain intervals. While holding the side edges of the TAC film 3, the clips 15 are moved along each rail 11 or 12, and thereby stretching the TAC film 3 in the film width directions B. In this embodiment, the TAC film 3 is stretched in the film width directions B such that the width of the TAC film 3 after the stretching becomes 103% of the width of the same before the stretching. The stretch ratio is not limited to this, but may be appropriately changed in accordance with desired optical properties and the like.

The first chain 13 is bridged across a drive sprocket wheel 21 and a driven sprocket wheel 23, and guided by the first rail 11. The second chain 14 is bridged across a drive sprocket wheel 22 and a driven sprocket wheel 24, and guided by the second rail 12. The drive sprocket wheels 21 and 22 are provided at a tenter exit 27 side, and are driven and rotated by drive mechanisms (not shown). The driven sprocket wheels 23 and 24 are provided at a tenter entrance 26 side.

Figure 3:
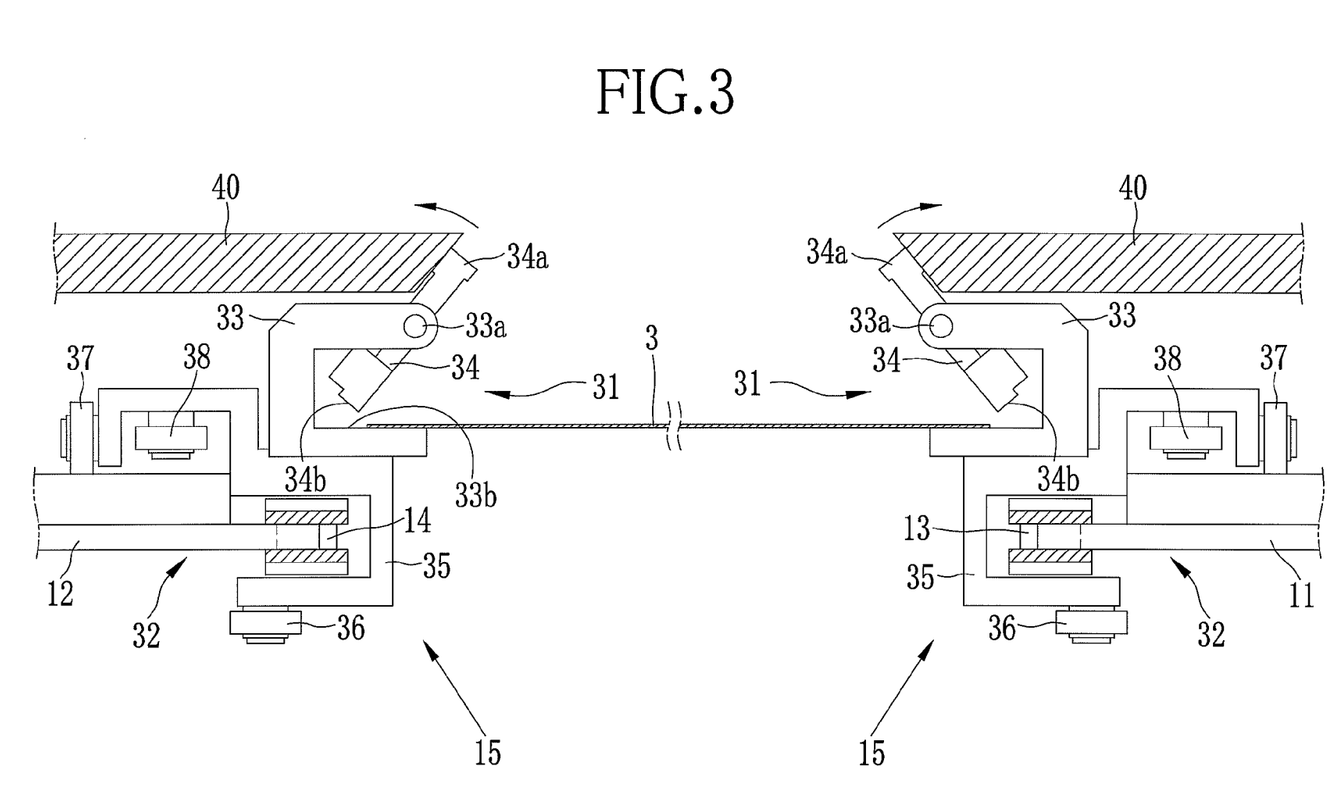
FIG. 3 is a side elevational view illustrating a clip.

As shown in FIG. 3, each clip 15 is constituted of a clip body 31 and a rail attachment portion 32. The clip body 31 is constituted of a substantially C-shaped frame 33 and a flapper 34. The flapper 34 is rotatably attached to the frame 33 through an attachment shaft 33a. The flapper 34 moves between holding position and releasing position. In the holding position, the flapper 34 becomes vertical. In the releasing position, as shown in FIG. 3, a releasing member 40 contacts and pushes an engagement head 34a of the flapper 34, and thereby tilting the flapper 34 from the vertical position. That is, the flapper 34 swings around the attachment shaft 33a. The flapper 34 is normally in the holding position under its own weight. The TAC film 3 is held between a film holding surface 33b of the frame 33 and a flapper lower surface 34b of the flapper 34. The film holding initiates at a position (holding initiation point) PA (see FIG. 2).

The rail attachment portion 32 is constituted of an attachment frame 35 and guide rollers 36, 37 and 38. The first chain 13 or the second chain 14 is attached to the attachment frame 35. The guide rollers 36, 37 and 38 rotate by contacting with a support surface of the drive sprocket wheel 21 or 22, or a support surface of the first rail 11 or the second rail 12. Owing to this, the clip 15 is guided along the first rail 11 or the second rail 12 without dropping off of the drive sprocket wheels 21 or 22.

The releasing member 40 is arranged near the sprocket wheel 21, 22, 23 and 24 (see FIG. 2). The releasing members 40 near the driven sprocket wheels 23 and 24 contact and push the engagement heads 34a of the flappers 34 of the clips 15 at the position upstream from the position PA, and thereby putting the flappers 34 into the releasing position. Owing to this, the clips 15 can receive the side edges of the TAC film 3. At the time when the clips 15 pass the position PA, the releasing members 40 retract from the engagement heads 34a, and thereby putting the flappers 34 into the holding position. Owing to this, the clips 15 hold the side edges of the TAC film 3. In the same manner, the releasing members 40 near the drive sprocket wheels 21 and 22 put the flappers 34 into the releasing position at the time when the clips 15 pass a position (holding release point) PB. Owing to this, the clips 15 release the holding of the side edges of the TAC film 3.

Figure 4:
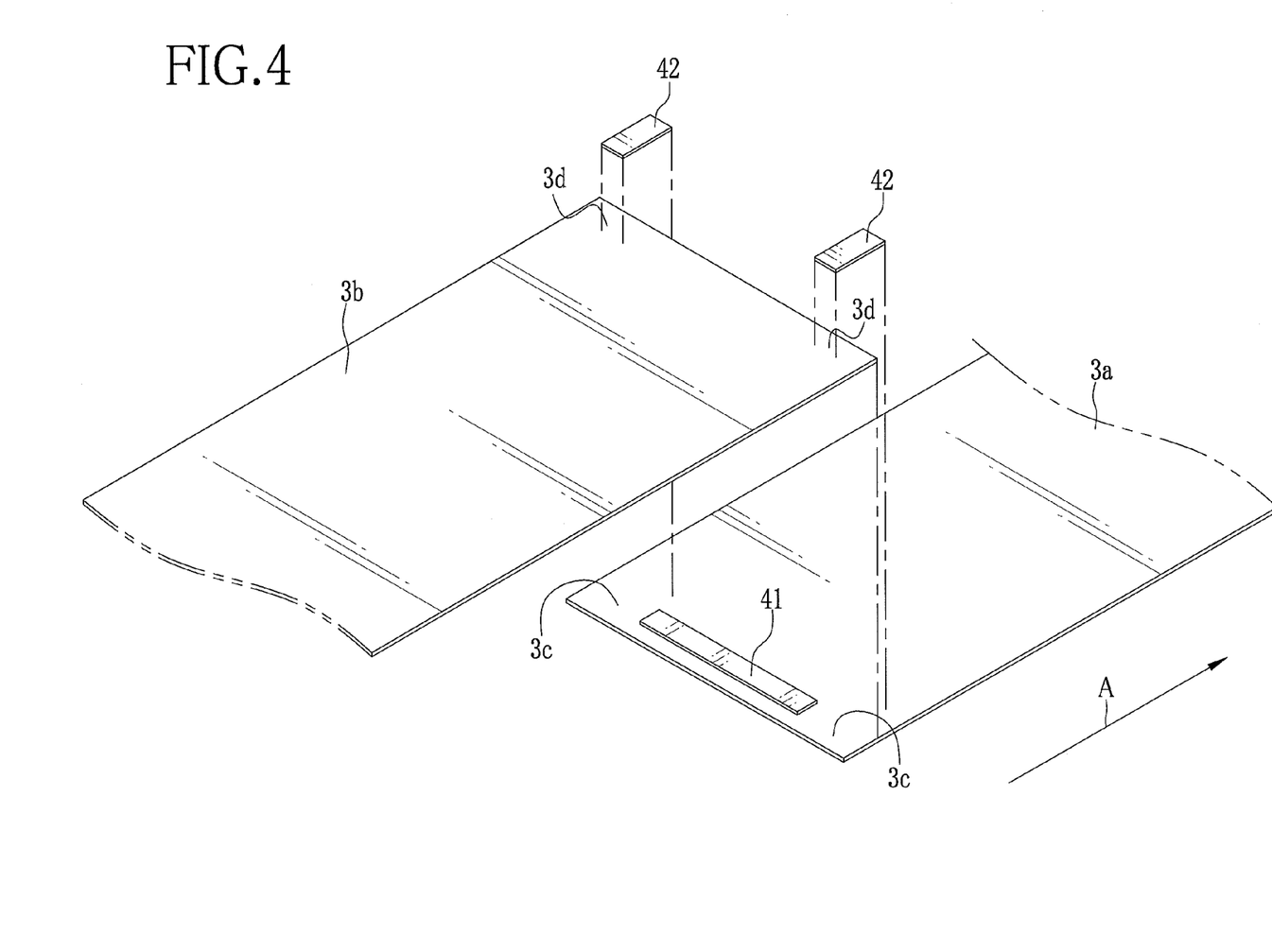
FIG. 4 is a perspective view illustrating a leading TAC film, a following TAC film, a double-sided adhesive tape, and single-sided adhesive tapes.
Figure 5A:
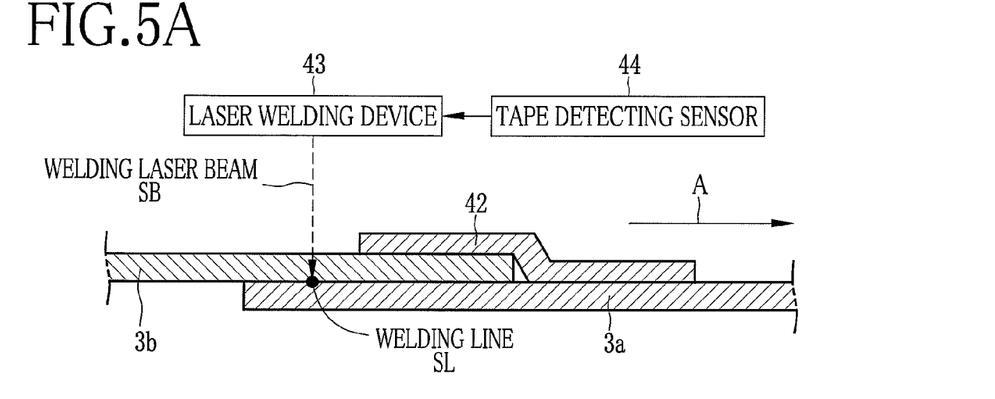
FIGS. 5A, 5B and 5C are sectional views each illustrating the leading TAC film, the following TAC film, the single-sided adhesive tape, a laser welding device, a welding line SL, and a cutout line CL.
Figure 5B:
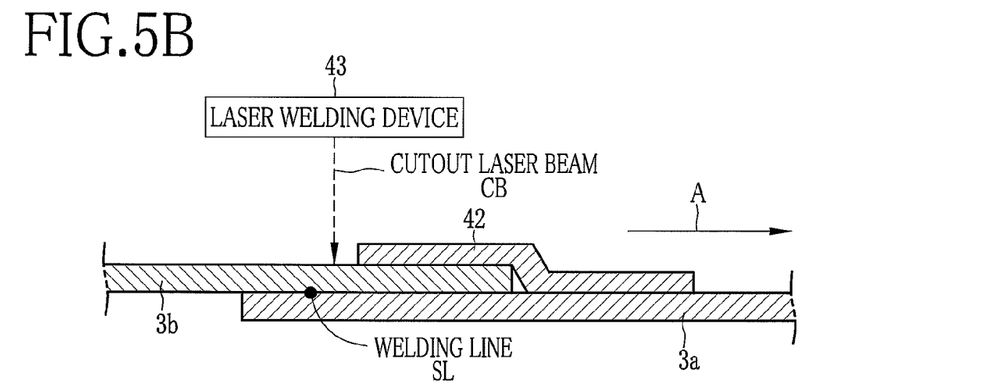
Figure 5C:
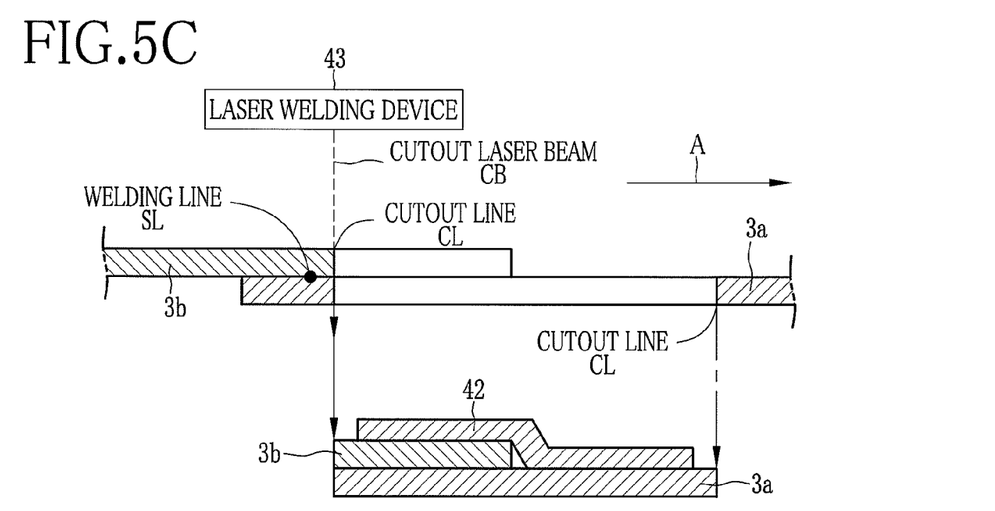

As shown in FIGS. 4 and 5, the TAC films 3 are connected to continuously stretch them in the tenter 5. A rear end portion of the TAC film 3 (leading film 3a), which has been supplied from the supplying chamber 4, and a front end portion of the newly supplied TAC film 3 (following film 3b) are connected using a double-sided adhesive tape 41 and a single-sided adhesive tape 42. The double-sided adhesive tape 41 is used for connecting main parts of the TAC films 3 that are going to be a final product. The single-sided adhesive tape 42 is used for connecting the side edges of the TAC films 3 that are going to be slit in a later process. Base materials and adhesive materials for the adhesive tapes 41 and 42, and thickness thereof are not limited. For example, commercially available adhesive tapes having a polyester film base and an acrylic adhesive material may be used. The base materials for the adhesive tapes 41 and 42 are generally made of polyester and the like.

To connect the rear end portion of the leading film 3a and the front end portion of the following film 3b with the double-sided adhesive tape 41, first of all, the double-sided adhesive tape 41 is stuck on an upper surface of the rear end portion of the leading film 3a. Then, the front end portion of the following film 3b is placed on the rear end portion of the leading film 3a, and thereby connecting the films 3a and 3b with the double-sided adhesive tape 41. The films 3a and 3b are also connected with the single-sided adhesive tape 42. Side edges 3c of the rear end portion of the leading film 3a and side edges 3d of the front end portion of the following film 3b are connected with the single-sided adhesive tapes 42. The connection using the tapes 41 and 42 is performed upstream from the reservoir 10. At the time of the connection, the TAC film 3 that has been reserved in the reservoir 10 is sent to the tenter 5. Owing to this, the film connection can be performed without stopping the film conveyance. The film connection may be performed automatically by machine, or may be performed manually in the case where the off-line stretching device 2 has a simple configuration. When the film connection is performed by an automatic connecting device, the rear end portion and the front end portion to be connected are located at predetermined positions. Then, the double-sided adhesive tape 41 is supplied and stuck at a predetermined position. After that, the rear end portion and the front end portion are layered such that the double-sided adhesive tape 41 is interposed there between, and pressed to adhere each other. Next, the single-sided adhesive tapes 42 are supplied at predetermined positions and connect the leading and following films 3a and 3b.

After being stretched in the tenter 5, the TAC films 3 are sent to a laser welding device 43, as shown in FIG. 1. The laser welding device 43 is provided with a tape detecting sensor 44 for detecting the single-sided adhesive tape 42, as shown in FIGS. 5A, 5B and 5C. The tape detecting sensor 44 outputs a tape detection signal to the laser welding device 43 when detecting the existence of the single-sided adhesive tape 42.

Figure 6:
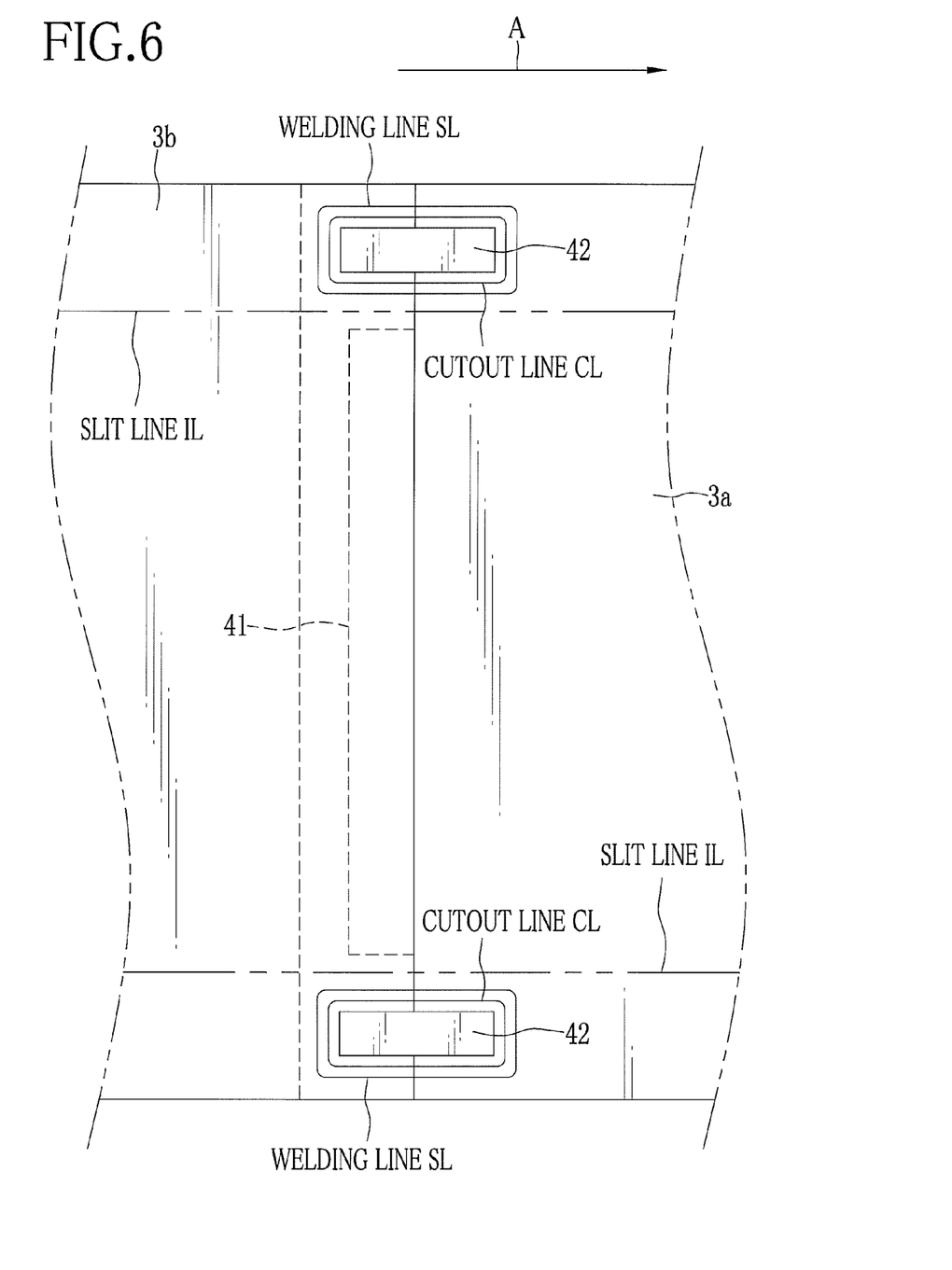
FIG. 6 is a top plan view illustrating the leading TAC film, the following TAC film, the double-sided adhesive tape, the single-sided adhesive tapes, the welding line SL, the cutout line CL, and slit lines IL.

As shown in FIGS. 5A and 6, the laser welding device 43 emits a welding laser beam SB along a welding line SL from above the TAC films 3 in response to the tape detection signal. The welding laser beam SB is emitted around the single-sided adhesive tape 42. The leading and following films 3a and 3b are welded to each other by the welding laser beam SB. At this time, the laser welding device 43 emits the welding laser beam SB while focusing on the upper surface of the leading film 3a (or a lower surface of the following film 3b). When the welding laser beam SB is emitted, the upper surface of the leading film 3a is melted by heat, and the heat is transferred to the lower surface of the following film 3b and melts it. Owing to this, the leading and following films 3a and 3b are welded along the welding line SL.

As shown in FIGS. 5B and 6, the laser welding device 43 emits a cutout laser beam CB along a cutout line CL from above the TAC films 3, after welding the leading and following films 3a and 3b along the welding line SL. The cutout line CL is positioned inside the welding line SL around the single-sided adhesive tape 42. The leading and following films 3a and 3b are cut out by the cutout laser beam CB along the cutout line CL. At this time, the laser welding device 43 emits the cutout laser beam CB while focusing on an upper surface of the following film 3b. The laser welding device 43 continues the emission of the cutout laser beams CB while moving the focus point thereof lower until the focus point reaches a lower surface of the leading film 3a. Owing to this, the part surrounded by the cutout line CL is cut out. The cut out part of the leading and following films 3a and 3b with the single-sided adhesive tape 42 is absorbed by an absorbing device and disposed since the tape 42 cannot be recycled.

In this embodiment, the laser welding device 43 is moved in synchronization with the conveyance of the TAC film 3 while the laser welding device 43 performs the welding along the welding line SL and the cutting out along the cutout line CL. It is also possible to perform the welding and cutting out processes while stopping the film conveyance. In this case, the reservoir 10 is provided downstream in the convey direction A and the TAC film 3 is reserved for a length enough for performing the welding and cutting out processes.

Since the leading and following films 3a and 3b are welded along the welding line SL by the laser welding device 43, the part cut out along the cutout line CL do not fall into pieces when it is cut out.

After the cutting out process in the laser welding device 43, the TAC films 3 are sent to an edge slitting device 45 as shown in FIG. 1. At this time, the leading film 3a and the following film 3b are prevented from parting. The edge slitting device 45 slits both side edges of the TAC films 3 along slit lines IL (see FIG. 6). The slit film edges are sent to a crusher 46 by a cutter blower (not shown) and shredded into chips by the crusher 46. Since the chips are recycled as polymer material for preparing the dope, the materials are efficiently utilized, and therefore the production cost is reduced.

The film edges sent to the crusher 46 do not have the single-sided adhesive tape 42 attached, and therefore saving the trouble of removing the tape 42. The TAC films 3 whose side edges have been slit by the edge slitting device 45 are sent to the stress relaxation chamber 6.

In the stress relaxation chamber 6, plural rollers 47 are provided. While being conveyed by the rollers 47, the TAC films 3 are heated and thereby relaxing the internal stress thereof. In the stress relaxation chamber 6, an air blower (not shown) sends air at a desired temperature. The temperature of the air is preferably in the range of 20° C. to 250° C. Then, the TAC films 3 are sent to the cooling chamber 7.

In the cooling chamber 7, the TAC films 3 are cooled until the temperature thereof reaches 30° C. or less, and then sent to the winding chamber 8. In the winding chamber 8, the TAC films 3 are wound by a winding roll 48. At the time of winding, a press roller 49 applies tension to the TAC films 3.

Instead of using the laser welding device 43 for welding the leading and following films 3a and 3b along the welding line SL, acetone may be used for connecting the films 3a and 3b. Acetone is one of the solvents used for preparing the dope in the TAC film production. Note that other solvents such as, for example, methyl acetate or dioxolane may also be used.

Figure 7:
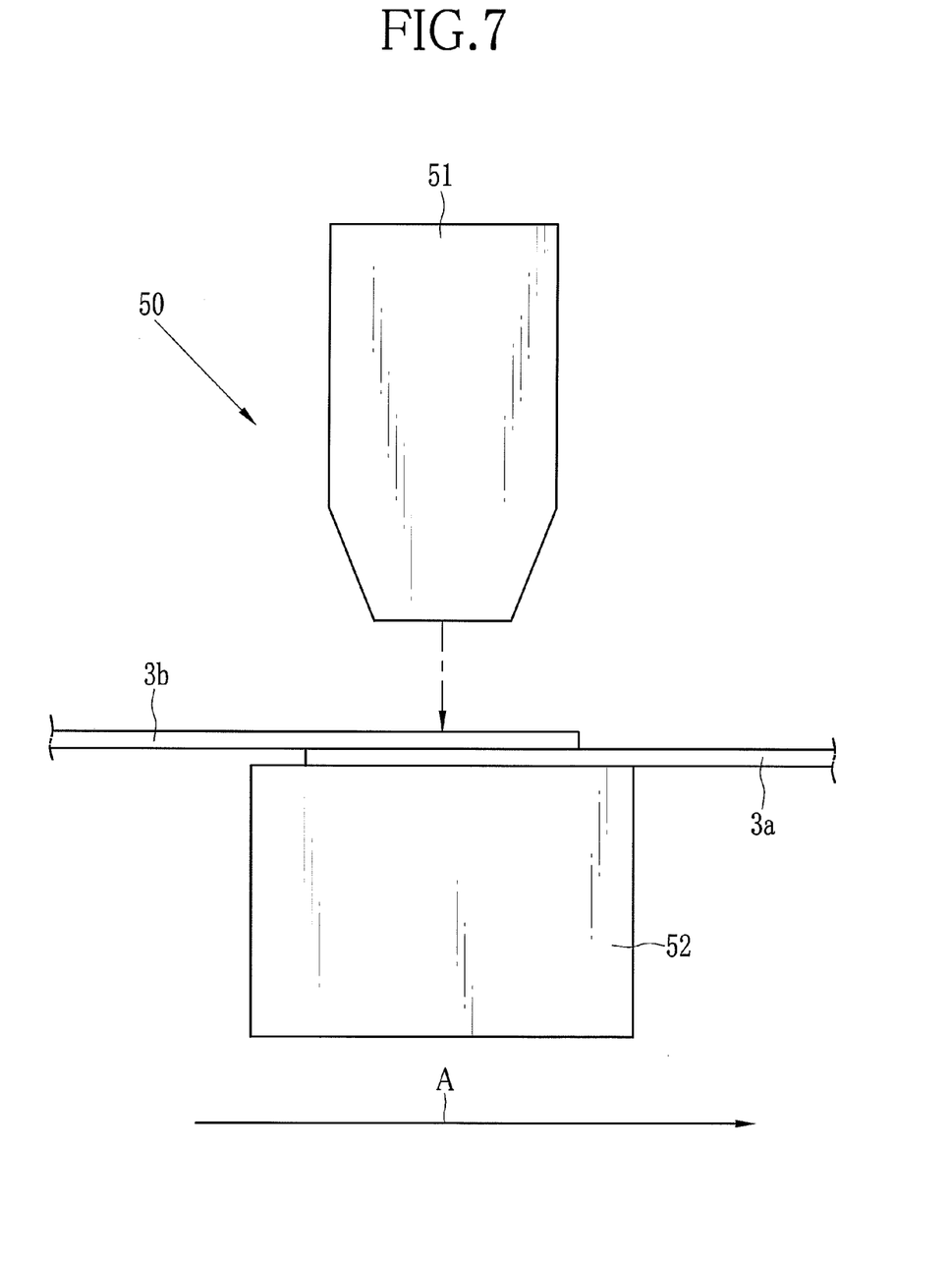
FIG. 7 is a side elevational view illustrating a heat sealer.

Instead of the laser welding device 43, a heat sealer 50 shown in FIG. 7 may also be used for connecting the leading and following films 3a and 3b along the welding line SL.

The heat sealer 50 is provided with a seal head 51. The rear end portion of the leading film 3a is placed on a stage 52, and the front end portion of the following film 3b is layered thereon. Then, the seal head 51 is pressed against the films 3a and 3b. The leading and following films 3a and 3b are connected by the effect of the heat conduction. Instead of the heat sealer 50, an impulse sealer may also be used for connecting the leading and following films 3a and 3b.

Figure 8:
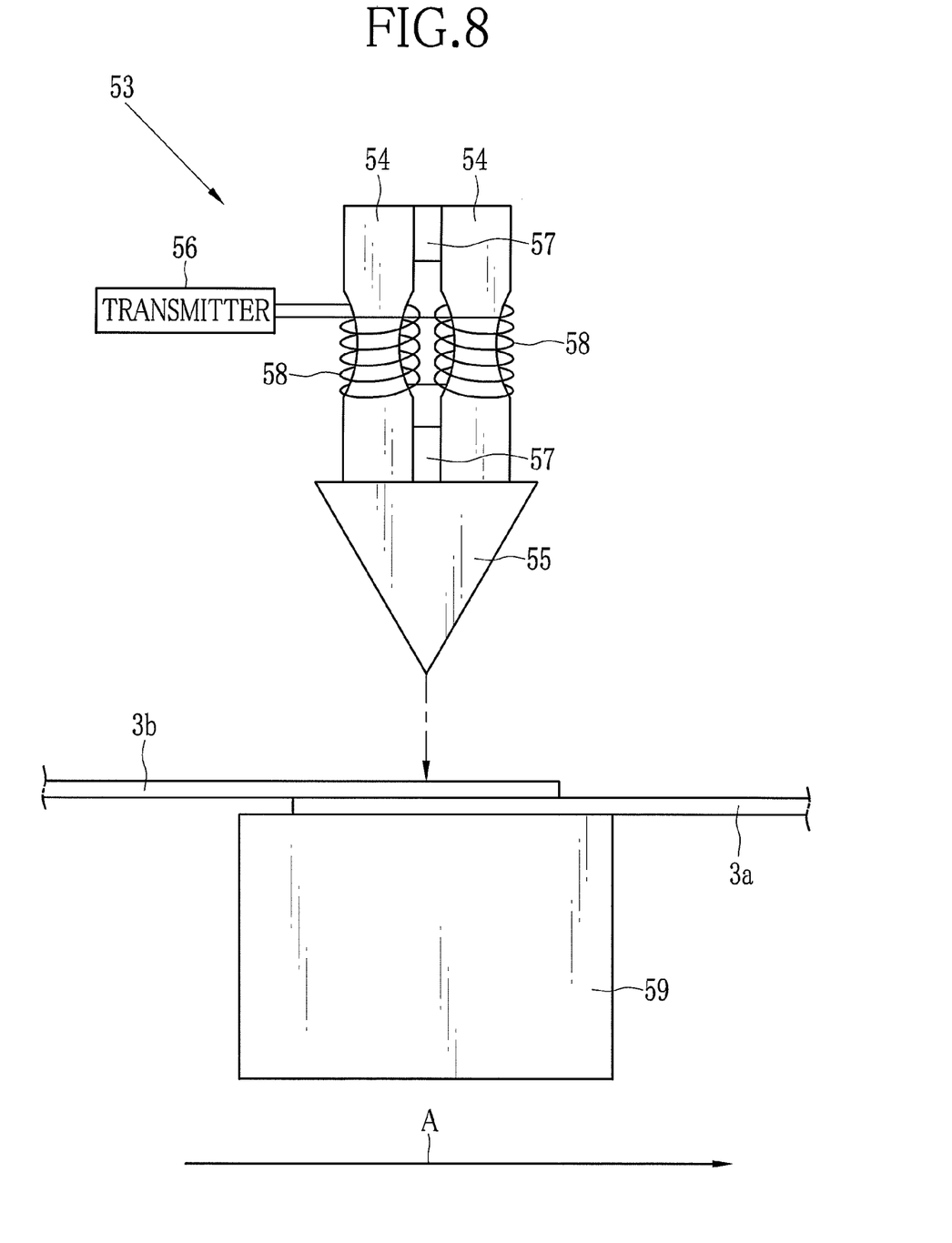
FIG. 8 is a side elevational view illustrating an ultrasonic joining device.

Instead of the laser welding device 43, an ultrasonic joining device 53 shown in FIG. 8 may also be used for connecting the leading and following films 3a and 3b along the welding line SL.

The ultrasonic joining device 53 mechanically oscillates the TAC films 3 for 20000 to 28000 times per second with amplitude of 0.03 mm. By being oscillated, the TAC films 3 are heated and welded. The ultrasonic joining device 53 is provided with transducers 54, a horn 55, and a transmitter 56. A permanent magnet 57 is provided between the transducers 54. Each transducer 54 is wounded with a coil 58. The transmitter 56 drives the transducers 54 through the coils 58. The transducers 54 convert electric oscillation into mechanical oscillation. The horn 55 amplifies the mechanical oscillation of the transducers 54 and transfers the oscillation to the leading and following films 3a and 3b on a stage 59. Owing to the oscillation, the leading and following films 3a and 3b are heated and welded.

Figure 9:
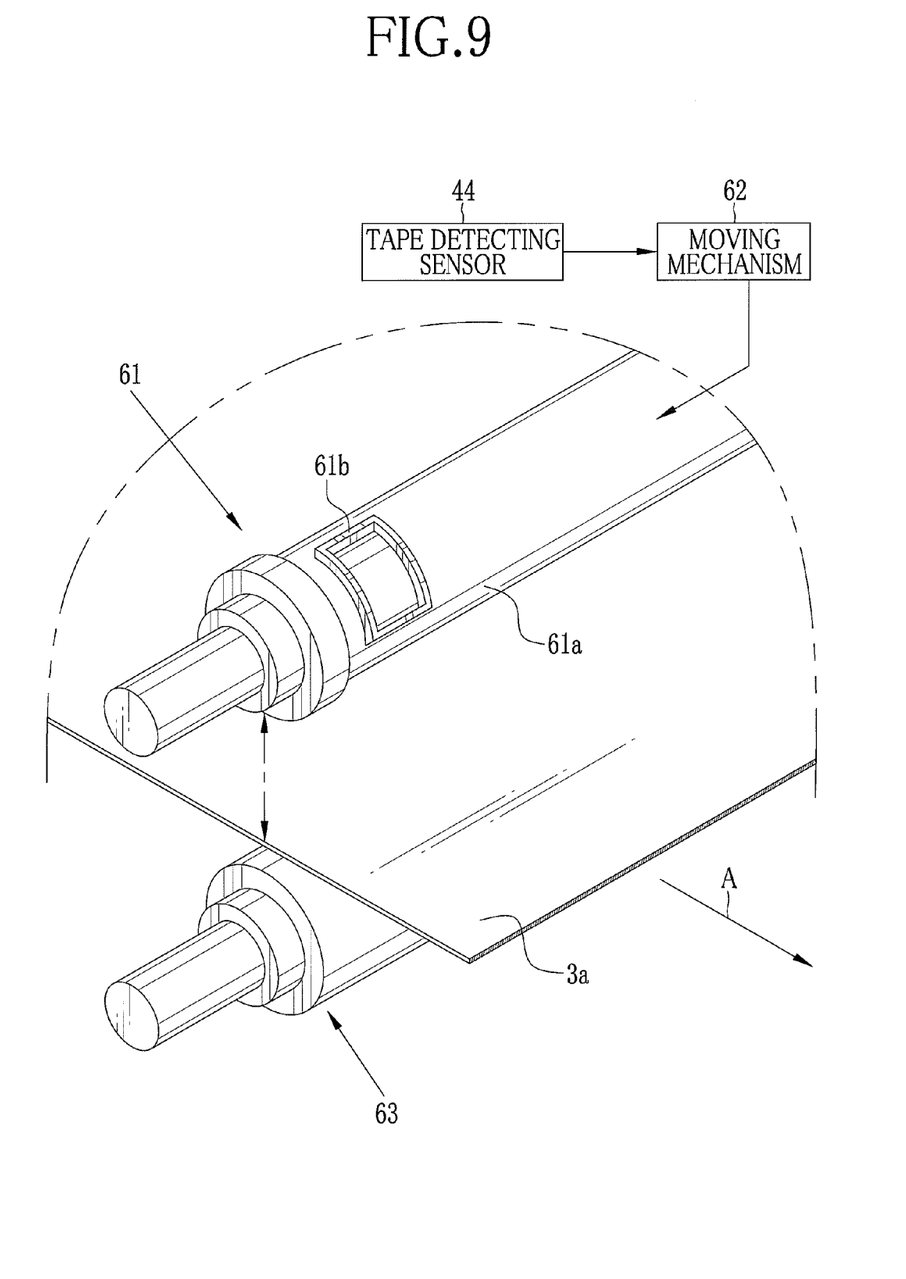
FIG. 9 is a perspective view illustrating a rotary die cutter, a convey roller, and the leading TAC film.
Figure 10:
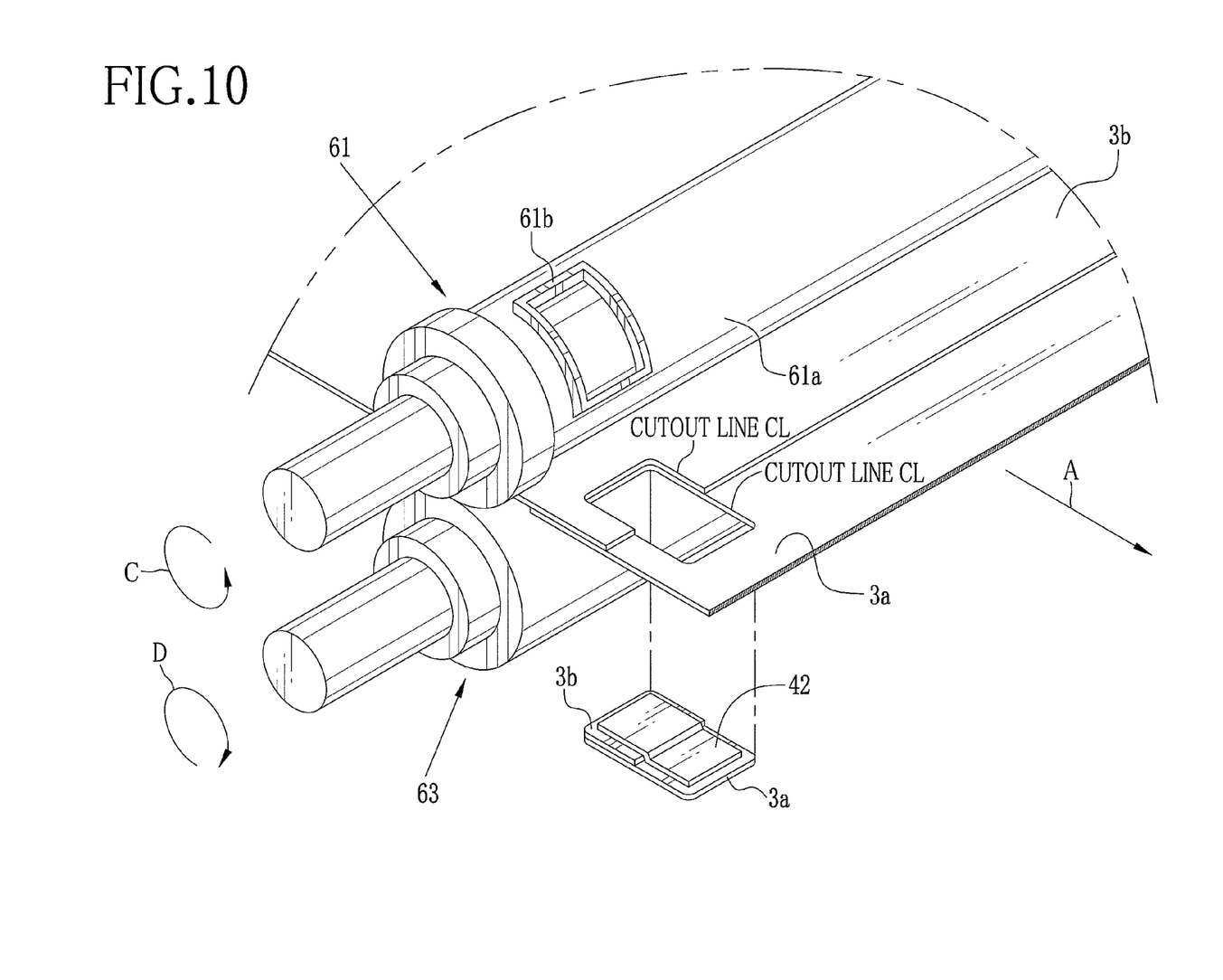
FIG. 10 is a perspective view illustrating the rotary die cutter, the convey roller, the leading TAC film, the following TAC film, and the single-sided adhesive tape.

Instead of the laser welding device 43, a rotary die cutter 61 shown in FIGS. 9 and 10 may also be used for cutting out the part surrounded by the cutout line CL.

The rotary die cutter 61 is rotatable as well as vertically movable. The movement of the rotary die cutter 61 is controlled by a moving mechanism 62. On a cylinder surface of a roller body 61a of the rotary die cutter 61, raised cutter portions 61b are respectively formed at opposite ends. Note that FIGS. 9 and 10 show only one end of the rotary die cutter 61, however, the rotary die cutter 61 extending in the width direction of the TAC film 3 has another cutter portion 61b on the other end thereof. The shape of an outer perimeter of each cutter portion 61b is identical to the cutout line CL. The tape detecting sensor 44 is connected to the moving mechanism 62. The tape detecting sensor 44 outputs the tape detection signal to the moving mechanism 62 when detecting the single-sided adhesive tape 42. The rotary die cutter 61 and the convey roller 63 are respectively attached to attachment members (not shown) in a rotatable manner.

The moving mechanism 62 moves the rotary die cutter 61 down in response to the tape detection signal. Owing to this, the rear end portion of the leading film 3a and the front end portion of the following film 3b are interposed between the rotary die cutter 61 and the convey roller 63. The TAC films 3 are conveyed in the convey direction A. Owing to the conveyance of the TAC films 3, the rotary die cutter 61 rotates in a direction C shown in FIG. 10 and the convey roller 63 rotates in a direction D shown in FIG. 10. When the rotary die cutter 61 rotates in the direction C, the roller body 61a rolls over the leading and following films 3a and 3b. Owing to this, the cutting portions 61b cut out the TAC films 3 (leading film 3a and following film 3b). The moving mechanism 62 controls the movement of the rotary die cutter 61 such that the rotary die cutter 61 cuts out the TAC films 3 along the cutout line CL. The cut out part of the leading and following films 3a and 3b has the single-sided adhesive tape 42 attached. Since the tape 42 cannot be recycled, the cut out part is absorbed by the absorbing device and disposed. After cutting out along the cutout line CL, the moving mechanism 62 moves the rotary die cutter 61 up.

The TAC film 3 is produced according to the well-known solution casting method such as, for example, a method disclosed in Japanese Patent Laid-open Publication No. 2005-104148. To increase the film production speed, the dope including TAC and the solvent is cast on the cooled drum. The casting film is cooled and gelated to have the self-supporting properties. After having possessed the self-supporting properties, the casting film is peeled. The peeled film is dried in a pin tenter and then wound into a roll form as a TAC film. When the present invention is applied to such TAC film, the TAC film having excellent optical properties can be produced effectively and efficiently.

In this embodiment, the TAC film 3 is used as the example of the polymer film. However, the present invention can also be applied to other kinds of polymer films.

Various changes and modifications are possible in the present invention and may be understood to be within the present invention.

What is claimed is:

1. A method for stretching polymer films in width directions thereof comprising the steps of:

connecting a rear end of leading said polymer film and a front end of following said polymer film using a connection tape composed of a first tape and a second tape, said first tape connecting side edges of said polymer films, said second tape connecting main parts of said polymer films, said main part being a center part in the width direction of said polymer film between said side edges, said main part becoming an end product;

supplying the connected polymer films continuously;

stretching the supplied polymer films by holding both side edges thereof with clips, said polymer films being conveyed by said clips during said stretching step;

welding said leading polymer film and said following polymer film along a welding line after said stretching step, said welding line surrounding said first tape;

cutting out a part with said first tape from the welded polymer films along a cutout line, said cutout line being inside said welding line and surrounding said first tape;

slitting said side edges from said main parts of said polymer films;

recovering the slit side edges; and wherein said first tape is a single-sided adhesive tape and said second tape is a double-sided adhesive tape.

2. The method according to claim 1, wherein said welding step is performed using a laser welding device.

3. The method according to claim 1, wherein said welding step is performed using a heat sealer.

4. The method according to claim 1, wherein said welding step is performed using an ultrasonic joining device.

5. The method according to claim 1, wherein said cutting out step is performed using a laser cutting device.

6. The method according to claim 1, wherein said cutting out step is performed using a rotary die cutter.

7. The method according to claim 1, wherein said welding step and said cutting out step are performed using a laser welding/cutting device.

8. A recovering device for recovering slit film edges provided to a stretching device for stretching polymer films in width directions thereof by holding both side edges of said polymer films with clips, said polymer films being conveyed by said clips during said stretching step, said recovering device comprising:

a connecting section for connecting a rear end of leading said polymer film and a front end of following said polymer film using a connection tape composed of a first tape and a second tape, said first tape connecting said side edges of said polymer films, said second tape connecting main parts of said polymer films, said main part being a center part in the width direction of said polymer film between said side edges, said main part becoming an end product;

a supplying section for supplying the connected polymer films continuously;

a welding section for welding said leading polymer film and said following polymer film along a welding line after said stretching step, said welding line surrounding said first tape;

a cutting out section for cutting out a part with said first tape from the welded polymer films along a cutout line, said cutout line being inside said welding line and surrounding said first tape;

a slitting section for slitting said side edges from said main parts of said polymer films;

a recovering section for recovering the slit side edges; and wherein said first tape is a single-sided adhesive tape and said second tape is a double-sided adhesive tape.

9. The method according to claim 1, wherein said rear end and said front end overlap.

10. The method of claim 9, wherein the first tape and second tape both extend over the overlap.

* * * * *